US010372997B2

(12) United States Patent
Blanchflower

(10) Patent No.: US 10,372,997 B2
(45) Date of Patent: Aug. 6, 2019

(54) UPDATING A BEHAVIORAL MODEL FOR A PERSON IN A PHYSICAL SPACE

(71) Applicant: LONGSAND LIMITED, Cambridge (GB)

(72) Inventor: Sean Blanchflower, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 0 days.

(21) Appl. No.: 15/544,321

(22) PCT Filed: Jan. 30, 2015

(86) PCT No.: PCT/EP2015/051996

§ 371 (c)(1),
(2) Date: Jul. 18, 2017

(87) PCT Pub. No.: WO2016/119897

PCT Pub. Date: Aug. 4, 2016

(65) Prior Publication Data

US 2018/0012079 A1 Jan. 11, 2018

(51) Int. Cl.

*G06K 9/00* (2006.01)
*G06Q 30/02* (2012.01)
*G06Q 10/06* (2012.01)
*G06Q 20/20* (2012.01)

(52) U.S. Cl.

CPC ..... *G06K 9/00771* (2013.01); *G06K 9/00335* (2013.01); *G06Q 10/067* (2013.01); *G06Q 20/20* (2013.01); *G06Q 30/02* (2013.01); *G06Q 30/0201* (2013.01)

(58) Field of Classification Search

CPC .......... G06K 9/00771; G06K 9/00335; G06Q 30/0201; G06Q 20/20; G06Q 10/067; G06Q 30/02

See application file for complete search history.

(56) References Cited

U.S. PATENT DOCUMENTS 7,319,479 B1 1/2008 Crabtree
7,606,728 B2 10/2009 Sorensen
(Continued)

OTHER PUBLICATIONS

International Searching Authority, International Search Report and Written Opinion; PCT/EP2015/051996; dated Sep. 29, 2015; 15 pages.

(Continued)

*Primary Examiner* — Jon Chang

(57) ABSTRACT

Examples disclosed herein relate to a person moving in a physical space. In one aspect, a method is disclosed. The method may include obtaining at least two images of a person from at least two cameras directed at a physical space, where the physical space may include a plurality of designated areas. The method may also include obtaining metadata associated with the images, based on the images and the metadata determining within the plurality of designated areas a set of designated areas visited by the person, for each designated area within the set of designated areas, determining an area information, and updating a database based on the set of designated areas and based on at least a portion of the area information associated with each designated area within the set of designate areas.

18 Claims, 6 Drawing Sheets

(56) References Cited

U.S. PATENT DOCUMENTS

| | | | | |
|---|---|---|---|---|
| 7,974,869 | B1 * | 7/2011 | Sharma | G06Q 30/0202 705/7.31 |
| 8,009,863 | B1 | 8/2011 | Sharma et al. | |
| 8,457,466 | B1 | 6/2013 | Sharma et al. | |
| 2005/0197923 | A1 * | 9/2005 | Kilner | G06K 9/00221 382/118 |
| 2006/0018516 | A1 * | 1/2006 | Masoud | G06K 9/00342 382/115 |
| 2008/0159634 | A1 * | 7/2008 | Sharma | G06K 9/00771 382/224 |
| 2009/0083122 | A1 * | 3/2009 | Angell | G06Q 10/0631 705/7.33 |
| 2010/0185487 | A1 * | 7/2010 | Borger | G06Q 10/087 705/7.29 |
| 2014/0125805 | A1 | 5/2014 | Golan et al. | |
| 2014/0278742 | A1 * | 9/2014 | MacMillan | G06Q 30/0201 705/7.29 |
| 2014/0363059 | A1 * | 12/2014 | Hurewitz | G06Q 30/0201 382/118 |
| 2015/0025936 | A1 * | 1/2015 | Garel | G06Q 30/0201 705/7.29 |

OTHER PUBLICATIONS

Hamid; "Caught on Camera: Retailers Using Video Surveillance to Track Shopping Habits"; dated: Jan. 23, 2014;http://www.thenational.ae/business/industry-insights/technology.

* cited by examiner

300

| AREA | VISITED AT | STAYED FOR |
|---|---|---|
| Entrance | 1/12/2015 8:58:10 | 1 sec |
| Dairy | 1/12/2015 8:58:20 | 74 sec |
| Bread | 1/12/2015 8:59:37 | 15 sec |
| Dairy | 1/12/2015 9:00:05 | 22 sec |
| Wine | 1/12/2015 9:00:59 | 1 sec |
| Register 1 | 1/12/2015 9:01:14 | 140 sec |
| Entrance | 1/12/2015 9:03:40 | 1 sec |

*FIG. 3*

UPDATING A BEHAVIORAL MODEL FOR A PERSON IN A PHYSICAL SPACE

BACKGROUND

With advances in image processing and object recognition techniques, computing devices today are capable of detecting and identifying people moving in real time and with high accuracy. Many physical spaces such as stores, conference halls, libraries, and the like, are equipped with a number of security cameras that can send real-time or stored images and video streams to a computing device for processing.

BRIEF DESCRIPTION OF THE DRAWINGS

The following detailed description references the drawings, wherein:

FIG. 3 illustrates example path data;

DETAILED DESCRIPTION

As discussed above, a physical space may be monitored by a number of cameras. The term "physical space" as used herein may include, for example, a building, a floor, a room, a parking lot, a street, a park, or any other type of real-world space. Each camera monitoring the physical space may have a different field of view and the fields of view of the different cameras may or may not overlap. A person moving within the space may therefore move from one camera's field of view to another camera's field of view. Depending on people's individual preferences and objectives, different people may choose to walk through or around the space in different paths and at different paces, visiting various areas of the space in different order, spending more time at some areas and less or no time at other areas.

Accordingly, a space may be divided (e.g., virtually, physically, or both) into a number of designated areas, such as aisles, rooms, sections, etc. In some examples, a designated area may be characterized and defined by the types of objects (e.g., products, books, or other items) located in, at, or near the area. Additionally or alternatively, a designated area may be defined and characterized by the area's position and boundaries within the space, or by the area's special function, such as an entrance, a restroom, an elevator, a customer service station, a cash register, etc.

Some examples disclosed herein describe a computing device. The computing device may include, among other things, an image processing engine. The image processing engine may be configured to obtain a plurality of images of a physical space, identify, within the plurality of images, a set of images representing a same person, wherein at least two of the set of images are captured by different cameras having different fields of view, and based on the set of images, determine a path associated with the person. The computing device may also include a path processing engine configured to obtain a behavioral model representing a plurality of paths associated with a plurality of people, and to update the behavioral model to represent the path.

Figure 1:
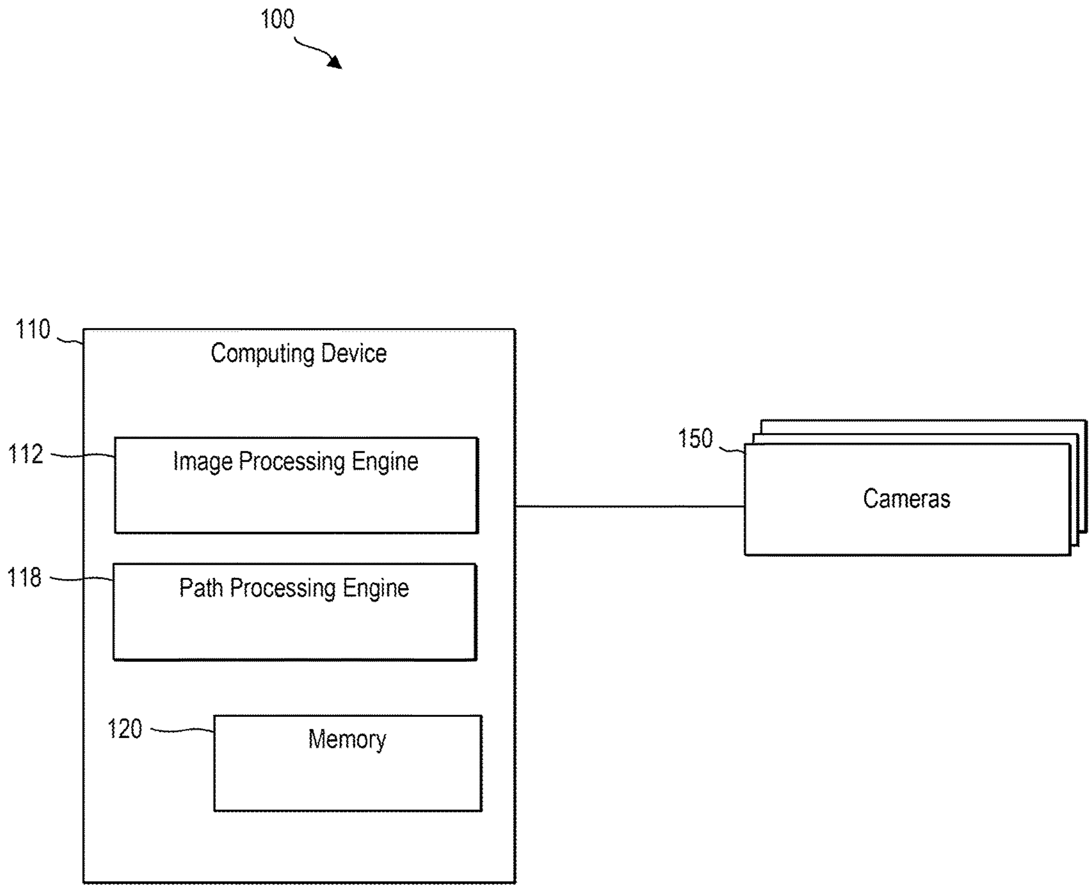
FIG. 1 is a block diagram of an example computing system.

FIG. 1 is a block diagram of an example computing system 100. Computing system 100 may include a computing device 110 and one or more cameras 150. Each camera 150 may be an electronic device or a combination of electronic devices capable of capturing still images and/or video streams (hereinafter collectively referred to as "images") and transmitting the images to computing device 110. Each camera 150 may be, for example, a surveillance/security camera (e.g., a closed-circuit television (CCTV) camera) a consumer digital camera, a camcorder, etc. Camera 150 may be an analog camera or a digital camera and may include one or more image sensors such as CMOS sensors, CCD sensors, and the like. In some examples, camera 150 may be integrated into or physically coupled to an electronic device such as a desktop computer, a laptop computer, a tablet computer, a smartphone, etc. Camera 150 may be communicatively coupled to computing device 110 via one or more cables and/or wirelessly, e.g., via Wi-Fi, Bluetooth, cellular communication, etc. In some examples, some or all of cameras 150 may be connected to each other and/o to computing device 110 via any combination of local-area networks (LANs), wide-area networks (WANs) such as the Internet, or other types of networks.

In some examples, each camera 150 may be positioned such that its field of view encompasses or includes one or more predefined areas or portions thereof. In some examples, some cameras 150 may have fields of view that do not encompass any portion of any predefined area. In some examples, at least two of cameras 150 may have different fields of view, which may or may not overlap.

Figure 2:
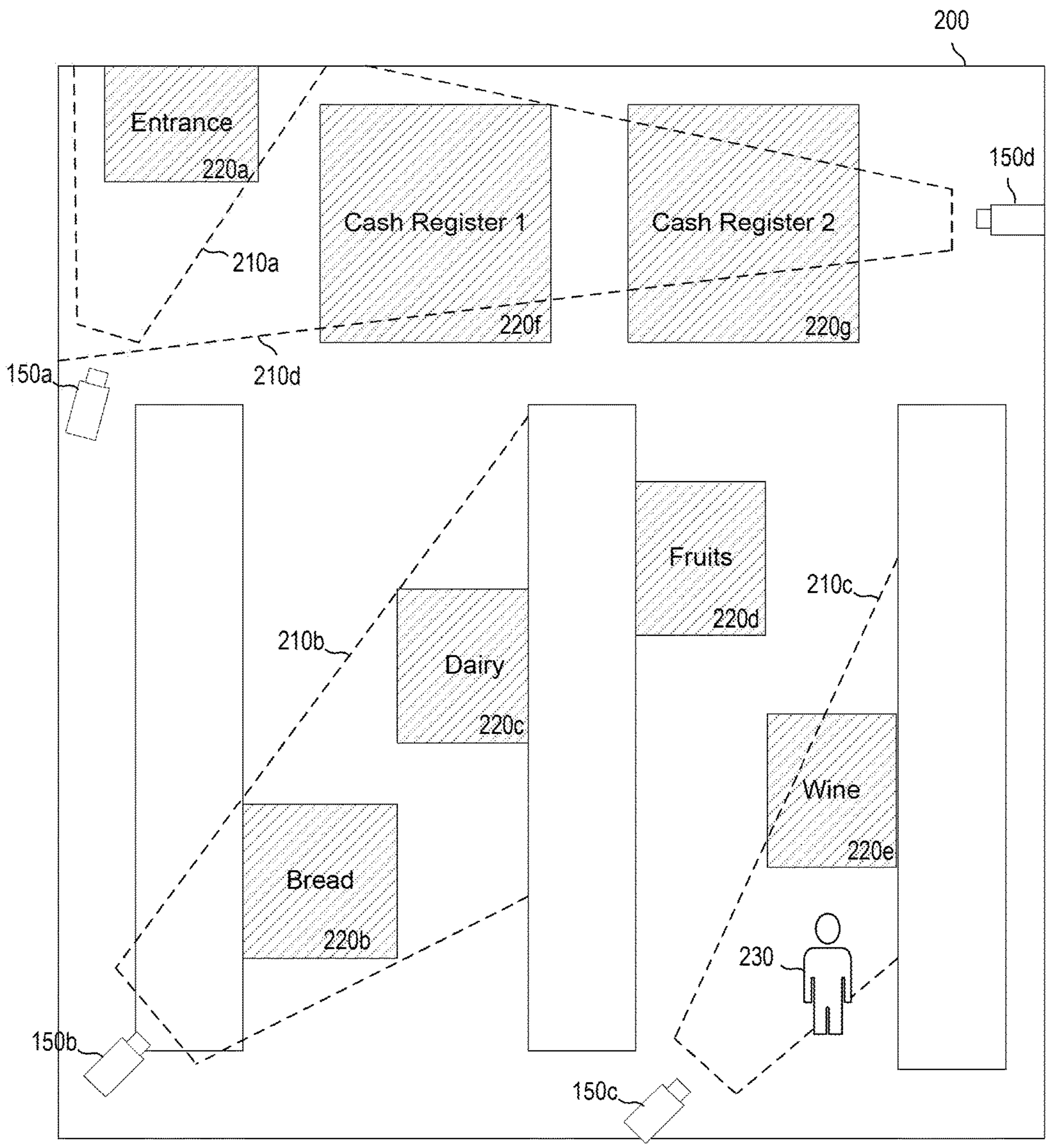
FIG. 2 is a diagram illustrating an example physical space.

FIG. 2 illustrates an example in which a person 230 is walking through physical space 200 that has designated areas **220*a*-220*g*. In the example of FIG. 2, cameras 150*a*, 150*b*, 150*c*, and 150*d* have fields of view 210*a*, 210*b*, 210*c*, and 210*d*, respectively. In this example, field of view 210a includes a large portion of area 220*a*; field of view 210*b* includes entire areas 220*b* and 220*c*; field of view 210*c* includes a portion of area 220*e*; field of view 210*d* includes area 220*a* and portions of areas 220*f* and 220*g*; and section 220*d*** is not included in any camera's field of view.

In some examples, each camera 150 may be associated with metadata. The metadata may describe the camera's model, serial number, configuration, and other relevant information. In some examples, the metadata may describe the camera's absolute or relative location within the physical space, and/or the camera's absolute or relative orientation. In some examples, however, the camera's location and/or orientation may be unknown and therefore may not be included in the metadata.

In some examples, each camera's metadata may describe or indicate which designated areas (if any) are partially or fully encompassed by or included in that camera's field of view. In some examples, each camera 150 may correspond to (i.e., include in its field of view) exactly one designated area, in which case the metadata may include area information for the designated area. The area information may include, for example, the designated area's description, a list of items (e.g., products, books, etc.) located at, in, or near the area, and any other relevant information describing the area.

In other examples, each camera 150 may correspond to any number of designated areas, in which case the metadata may include an area map that maps one or more sections within the field of view of camera 150 (or within an image captured by camera 150) to their respective designated areas, and stores area information for each designated area. The area map may be generated by a user during installation of computing system 100 and updated when areas are re-designated or when camera 150 is moved or repositioned. To generate or update the area map of a particular camera 150, the user may obtain an image captured by the particular camera, and identify on the image boundaries of the various designated areas included in the image. The user may then also input the area's information described above.

In some examples, the metadata may be stored in one or more memories, such as memory 120, a memory of camera 150 (not shown for brevity), and/or any other memory accessible by computing device 110. In some examples, some or all of the metadata may be sent by camera 150 to computing device 110 together with (e.g., embedded in) the images captured by camera 150. In some examples, metadata may include image-specific information such as the timestamp associated with the particular image (indicating the date and time at which the image was taken), as well as camera's settings (e.g., exposure, ISO, etc.) that were used for taking the particular image.

Referring back to FIG. 1, computing device 110 may include any electronic device or a combination of electronic devices. The term "electronic devices" as used herein may include, among other things, servers, desktop computers, laptop computers, tablet computers, smartphones, or any other electronic devices capable of performing the techniques described herein. In some examples, computing device 110 may be integrated with or embedded into one or more cameras 150.

As illustrated in the example of FIG. 1, computing device 110 may include, for example, an image processing engine 112, a path processing engine 114, and a memory 120. Memory 120 may include any type of non-transitory memory, and may include any combination of volatile and non-volatile memory. For example, memory 120 may include any combination of random-access memories (RAMs), flash memories, hard drives, memristor-based memories, and the like. Memory 120 may be located on computing device 110, or it may be located on one or more other devices communicatively coupled to computing device 110.

Image processing engine 112 may generally represent any combination of hardware and programming, as will be discussed in more detail below. In some examples, engine 112 may be configured to obtain a plurality of (e.g., two or more) images from one or more cameras 150, where at least two images are obtained from different cameras 150. As mentioned above, the term "image" as used herein may refer, among other things, to an image captured as a still image, to a frame or field of a video stream, etc. In some examples, the obtained images may be color or monochrome images, high-resolution or low-resolution images, uncompressed images, or images compressed using an image or video compression technique, such as JPEG, MPEG-2, MPEG-4, H.264, etc. (in which case engine 112 may be configured to decompress the images before further processing).

In some examples, engine 112 may be configured to identify within the plurality of images a set of two or more images representing the same person, that is, a set of images on which the same person appears. In some examples, at least two images within the set may be captured by different cameras 150 having different fields of view, which may or may not be overlapping. In order to identify the set of images representing the same person, engine 112 may employ one or more object recognition techniques. As used herein, "object recognition techniques" may refer to any combination of techniques and algorithms capable of detecting, identifying, and/or classifying one or more objects or humans in an image. For example, object recognition techniques may include background subtraction methods, optical flow methods, spatio-temporal filtering methods, or any combination of these or other methods.

In some examples, engine 112 may perform object recognition techniques on some or all of the plurality of images obtained from cameras 150, detect images on which at least one person appears, and identify each person by a set of characteristics associated with the person, such as the person's dimensions, facial features, clothes, walking style, and so forth. After identifying one or more people in the plurality of images, engine 112 may determine at least one set of two or more images representing the same person, for example, by comparing the characteristics associated with each person, finding people on different images whose characteristics match above a certain threshold, and determining that those "people" correspond to the same person.

Based at least on the set of images representing the same person, engine 112 may determine the person's path. As discussed above, engine 112 may obtain metadata associated with each image within the set, and the metadata may include a timestamp indicating the exact time at which the image was taken. Engine 112 may analyze each image within the set to determine the person's location within the image, and based on that location, determine the person's physical location within the physical space (e.g., space 200) at the exact time specified by the timestamp. In some examples, engine 112 may determine an exact physical location of the person, for example, if the metadata includes the camera's orientation and/or position based on which an exact location may be ascertained.

In other examples, camera's position/location data may not be available and the person's exact physical location may not be ascertainable based on the person's location within an image. In such examples, engine 112 may determine whether the person is located at, next to, or within the boundaries of a designated area. In some examples, engine 112 may make this determination based on metadata associated with the image. In some examples, if metadata includes area information about the single designated area corresponding to the entire image as discussed above, engine 112 may determine that the person was physically located at that designated area irrespective of the person's location within the image. In other examples, if metadata includes an area map mapping various locations or sections within the image to corresponding designated areas, engine 112 may determine, based on the area map, which designated area corresponds to the location within the image at which the person appears.

Based on the determined timestamps and designated areas (or exact locations), engine 112 may determine the person's path within the physical space. In some examples, the path may be represented by a chronological sequence of designated areas, thereby indicating which designated areas were visited by the person and in which order. In some examples, the path may also indicate the time at which each designated area was entered and left by the person. In some examples, the path may indicate the total amount of time spent by the person at each designated area. In some examples, engine 112 may be configured to include in the path only designated areas at which the person spent a predefined minimum period of time (e.g., 10 seconds). In some examples, the path may also include, for each designated area, its area information, such as area description, a list of objects located at the area, etc.

FIG. 3 illustrates an example path 300 of person 230 in physical space 200 from the example of FIG. 2. As illustrated in FIG. 3, for each designated area 220 visited by person 230 even briefly, path 300 includes the description of the area, when the person first entered the area, and the total amount of time the person spent in the area.

In some examples (not shown for brevity) engine 112 may also indicate, for each designated area in the path, whether the person inspected (e.g., took and held) an item (e.g., a product) while visiting the designated area; whether the person left the designated area with the item; the description of the item if the item could be identified using object recognition; whether the person visited the area alone or in a group of people; and any other ascertainable information associated with the person's visit of the designated area. After determining the person's path, image processing engine 112 may pass the path data to path processing engine 114.

Path processing engine 114 may generally represent any combination of hardware and programming, as will be described in more detail below. In some examples, engine 114 may be configured to obtain a behavioral model. The behavioral model may include data representing, among other things, a plurality of past (e.g., historical) paths, i.e., a plurality of paths taken by a plurality of people within a given physical space or within a number of physical spaces. As will be discussed below, the model may include either actual path data of the past paths, or analytical data representing (e.g., summarizing) the past paths, or both. In some examples, the behavioral model may be stored in and obtained from memory 120, or any other memory located on any other device. In some examples, the behavioral model may be stored in one or more databases, where the term "database" is used herein to generally refer to any data structure or collection of data.

The behavioral model may be generated and updated by engine 114 over time based on new paths received from engine 112. In some examples, when engine 114 receives new path data from engine 112, engine 114 may update the behavioral model to also represent the new path. In some examples, updating the behavioral model may include processing (e.g., filtering, sorting, etc.) the new path data and storing the new path data, processed and/or unprocessed, in the behavioral model.

In some examples, engine 114 may also update the behavioral model by storing, in association with each path, personal data of the person whose movements are reflected in the path. The personal data may include characteristics such as the person's age group, the person's gender; how many people accompanied the person; whether the person was pushing a cart, a stroller, or another item; and any other characteristics that can be determined using object recognition techniques discussed above.

In some examples, in addition to obtaining images from engine 112, engine 114 may obtain purchase data from one or more electronic point-of-sale (EPOS) systems (not shown in FIG. 1 for reasons of brevity). An EPOS system may be a cash register or any other electronic device or combination of electronic devices capable of registering sale transactions. The EPOS system may be a part of computing device 110 or be communicatively coupled to computing device 110, e.g., via one or more wireless and/or wired networks. In some examples, when a person makes a purchase, the EPOS system may generate and send purchase data associated with the purchase to computing device 110. The purchase data may include, for example, a list of purchased items, their prices, the time of purchase, information identifying the person, information identifying the particular EPOS system (e.g., cash register number), and any other relevant information.

When computing device 110 receives the purchase data, it may pass the data to engine 114, which may then associate (e.g., link) the purchase data with corresponding path data received from engine 112. Put differently, engine 114 may find path data corresponding to a person who made the purchase that is identified in the purchase data. For example, engine 114 may find, among multiple paths received from engine 112, a path that indicates that the person visited a designated area corresponding to the EPOS system that is identified in the purchase data, and that the visit occurred around the same time as the time identified in the purchase data (or that the person was the first person to leave the designated area after the time of the purchase). After identifying the corresponding path data, engine 114 may update the behavioral model by storing some or all of the purchase data in association with (e.g., as part of the same record as) the corresponding path data and personal data.

In some examples, engine 114 may also classify paths and determine whether or not a particular person's path belongs (e.g., fits into) any established path category. For example, engine 114 may run a statistical analysis on some or all of past path data stored in the behavioral model to determine one or more path categories, such that all paths in a particular category share some commonalities. For example, engine 114 may determine that some people visit many designated areas, spending a short amount of time at each area, while others visit fewer areas but spend more time at those areas. Engine 114 may then classify all people whose paths fall into the first category as "browsers" and classify all people who fall into the second category as "focused shoppers." After determining a path category for a person based on that person's path data, engine 114 may update the behavioral model, for example, by storing the path category in associated with that person's path data, for example, as part of the personal data. In some examples, engine 114 may update the definitions based on the new path data.

In some examples, the behavioral model may also include analytical data. Analytical data may include any data calculated based on any combination of path data (past and new), personal data, and purchase data. For example, analytical data may include a statistical summary or representation of past path data and data associated therewith. For example, analytical data may include, among other things, the average time people (e.g., shoppers) spent at a particular designated area; the most popular and the least popular designated areas; how likely were people who visited a particular area to but a product (or a specific product) at that area; how likely were people who visited a certain first area to also visit a certain second area; how likely were people who purchased a certain first product to also purchase a certain second product; whether a young person was more likely to visit a certain designated area and/or to purchase a certain product than a senior person; which designated areas were most popular with a certain demographic; whether shoppers of one category (e.g., "browsers") spend more money than shoppers of another category (e.g., "focused shoppers"); or any other analytical information that can be derived based on the data stored in the behavioral model. In some examples, the analytical data may also include the definitions of the various path categories discussed above.

In some examples, engine 114 may be configured to update the analytical data in the behavioral model based on newly obtained path data, personal data, and purchase data. As mentioned above, in some examples, because the behavioral model may include the analytical data representing the actual data (e.g., path data, the personal data, and/or the purchase data) the behavioral model may not store the actual data, thus saving significant memory space. In some examples, computing device 110 may be configured to send the behavioral model to another device or to receive updates to the behavioral model from another device, where the other device may be a remote server or computer communicatively coupled to computing device 110, for example, via one or more wireless and/or wired networks.

Figure 4:
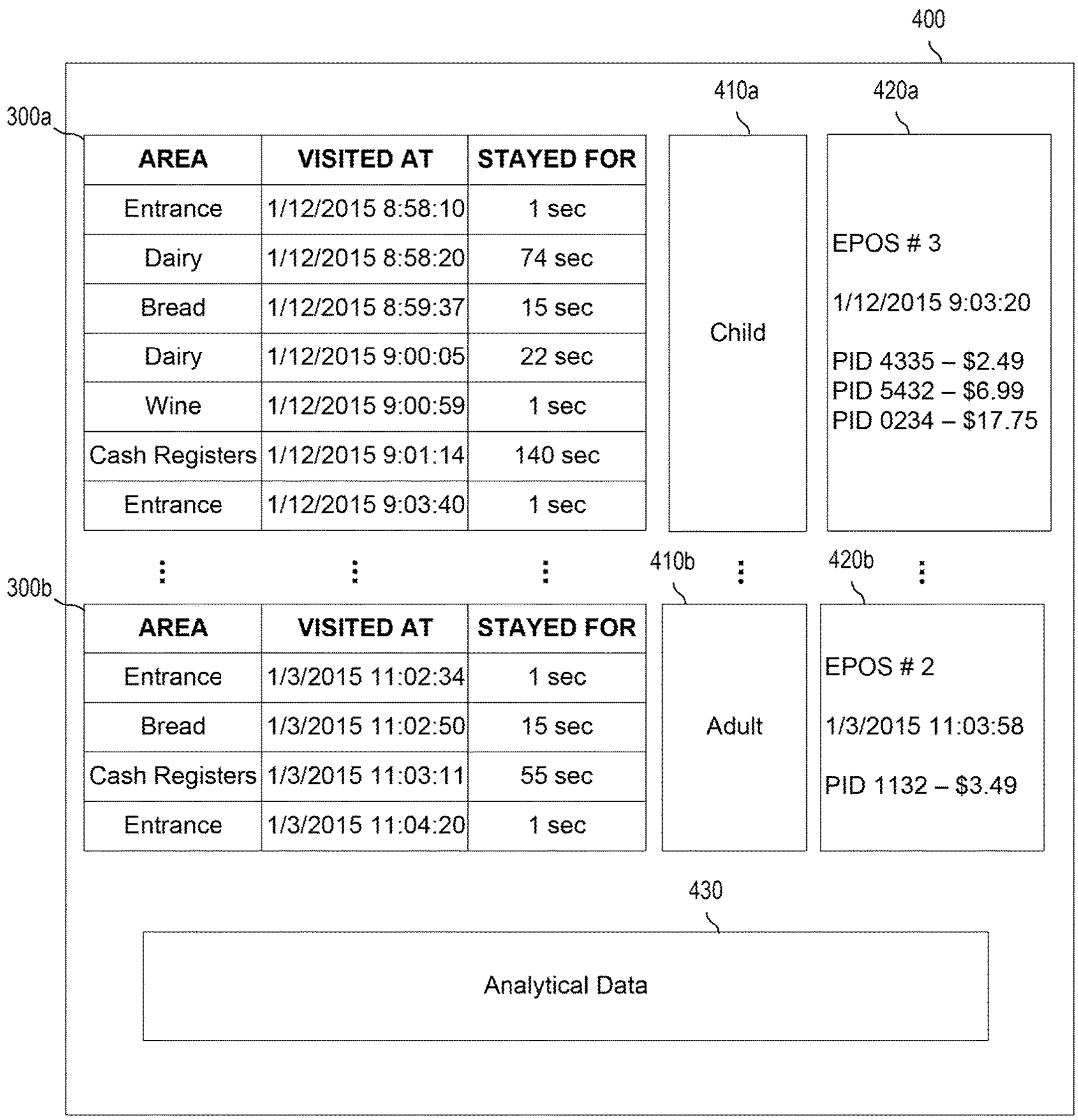
FIG. 4 illustrates an example behavioral model.

FIG. 4 shows an example behavioral model 400. In this example, model 400 stores analytical data 430 in addition to the actual path data (e.g., 300*a*, 300*b*, etc.) personal data (e.g., 410*a*, 410*b*, etc.) and purchase data (e.g., 420*a*, 420*b*, etc). In this example, personal data 410*a* and purchase data 420*a* are stored in association with path data 300*a*, and personal data 410*b* and purchase data 420*b* are stored in association with path data 300*b*.

In the foregoing discussion, engines 112 and 114 were described as any combinations of hardware and programming. Such components may be implemented in a number of fashions. The programming may be processor executable instructions stored on a tangible, non-transitory computer-readable medium and the hardware may include a processing resource for executing those instructions. The processing resource, for example, may include one or multiple processors (e.g., central processing units (CPUs), semiconductor-based microprocessors, graphics processing units (GPUs), field-programmable gate arrays (FPGAs) configured to retrieve and execute instructions, or other electronic circuitry), which may be integrated in a single device or distributed across devices. The computer-readable medium can be said to store program instructions that when executed by the processor resource implement the functionality of the respective component. The computer-readable medium may be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, or the like. In another example, the engines 112 and 114 may be implemented by hardware logic in the form of electronic circuitry, such as application specific integrated circuits.

Figure 5:
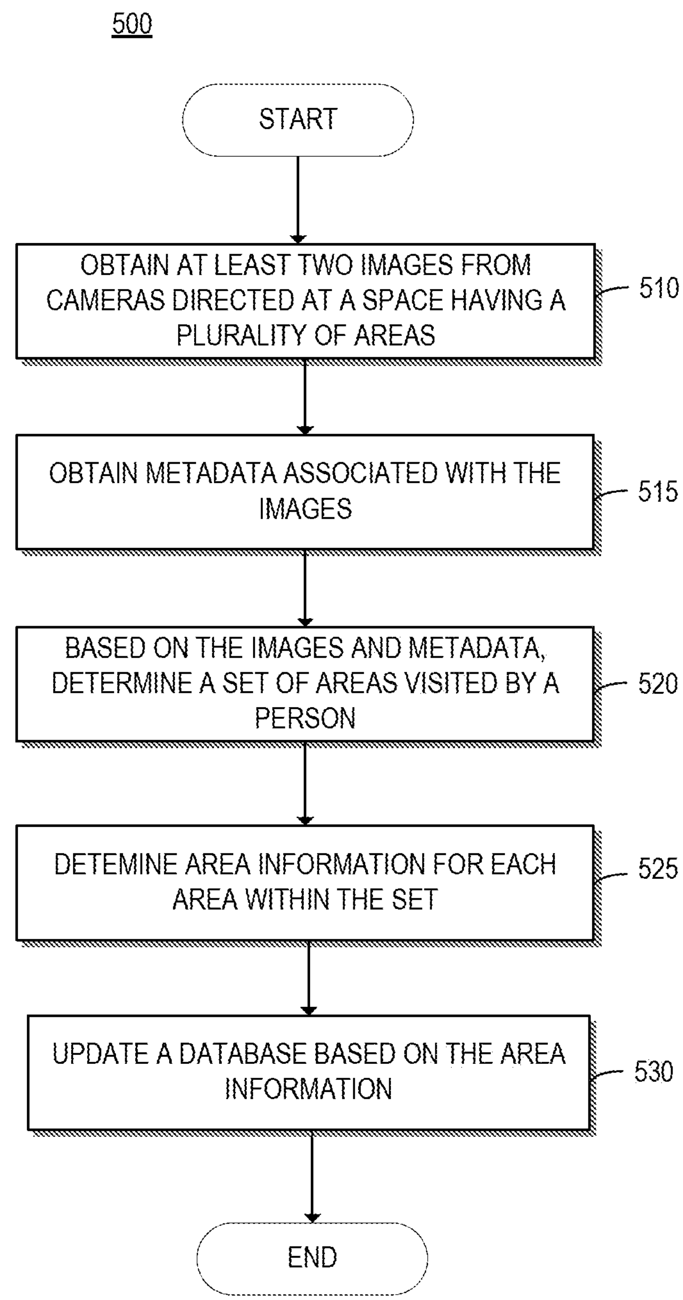
FIG. 5 shows a flowchart of an example method for determining designated areas visited by a person in a physical space.

FIG. 5 is a flowchart of an example method 500 for determining designated areas visited by a person in a physical space. Method 500 may be described below as being executed or performed by a system or by a computing device such as computing system 110 of FIG. 1. Other suitable systems and/or computing devices may be used as well. Method 500 may be implemented in the form of executable instructions stored on at least one non-transitory machine-readable storage medium of the system and executed by at least one processor of the system. Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or less blocks than are shown in FIG. 5. In some examples, one or more of the blocks of method 500 may, at certain times, be ongoing and/or may repeat.

At block 510, the method may obtain at least two images of a person from at least two cameras directed at a physical space, where the physical space may include a plurality of designated areas, as discussed above. At block 515, the method may obtain metadata associated with the images. As discussed above, the metadata may identify, among other things, which of the cameras are directed at which designated areas. At block 520, the method may determine within the plurality of designated areas, based on the images and the metadata, a set of designated areas visited by the person, as discussed above.

At block 525, the method may determine an area information for each designated area within the set of designated areas, where the area information may include any combination of at least the following information: a description of the designated area, a set of objects located at the designated area, a time at which the person visited the designated area, an amount of time spent by the person at the designated area, whether the person inspected a product at the designated area, and whether the person left the designated area with the product. At block 530, the method may update a database (e.g., a behavioral model) based on the set of designated areas and based on at a portion of the area information associated with each designated area within the set of designate areas.

Additional steps of method 500 (not shown for brevity) may include, for example, obtaining purchase data from an electronic point-of-sale (EPOS) system, determining whether the purchase data corresponds to the person, and if the purchase data corresponds to the person, updating the database based on the purchase data. In some examples, as discussed above, the purchase data may also include a timestamp. In such examples, the method may also identify within the set of designate areas a designated area associated with the EPOS system, and compare the timestamp to the time at which the person visited that designated area.

Figure 6:
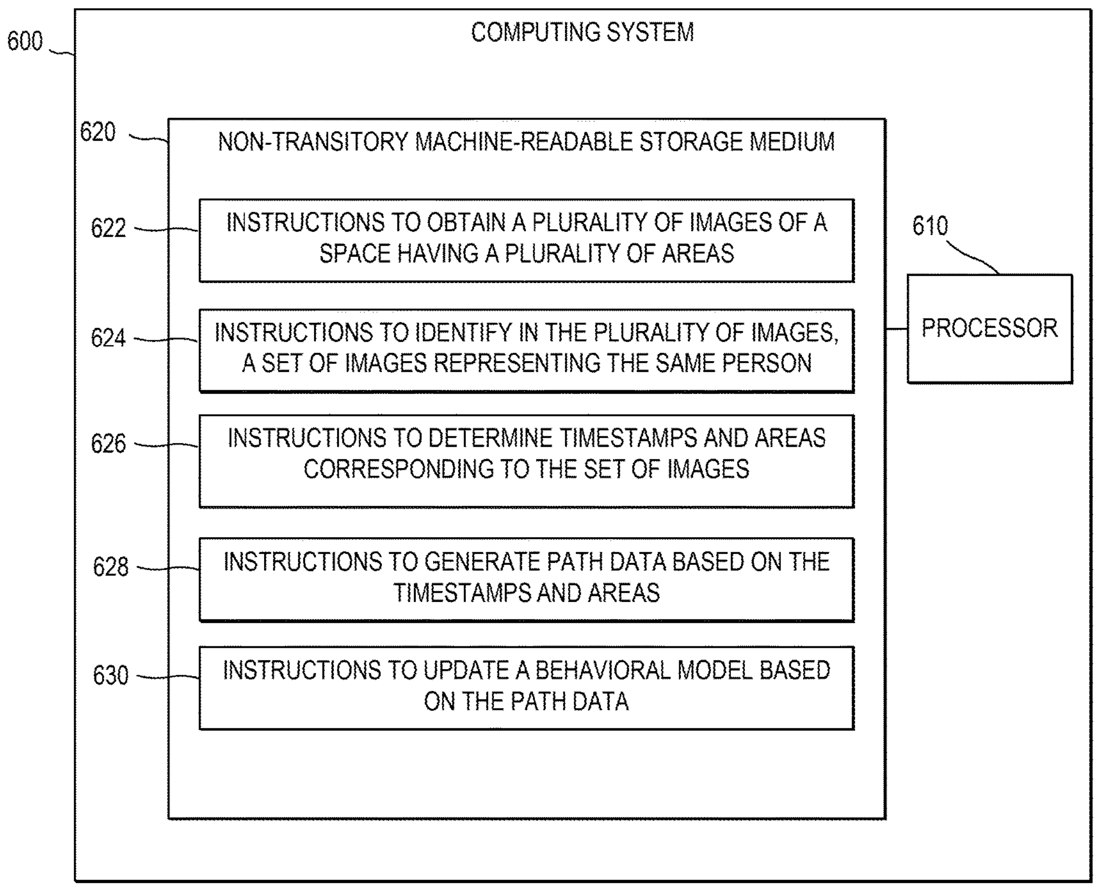
FIG. 6 is a block diagram of another example computing device.

FIG. 6 is a block diagram of an example computing device 600. Computing device 600 may be similar to computing device 110 of FIG. 1. In the example of FIG. 6, computing device 600 includes a processor 610 and a non-transitory machine-readable storage medium 620. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in non-transitory machine-readable storage medium 620. In the particular example shown in FIG. 6, processor 610 may fetch, decode, and execute instructions 622, 624, 626, 628, 630, or any other instructions not shown for brevity. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 620 may be any electronic, magnetic, optical, or other physical storage device that stores executable instructions. Thus, medium 620 may be, for example, Random Access Memory (RAM), an Electrically-Erasable Programmable Read-Only Memory (EEPROM), a storage drive, an optical disc, and the like. Medium 620 may be disposed within computing device 600, as shown in FIG. 6. In this situation, the executable instructions may be "installed" on computing device 600. Alternatively, medium 620 may be a portable, external or remote storage medium, for example, that allows computing device 600 to download the instructions from the portable/external/remote storage medium. In this situation, the executable instructions may be part of an "installation package". As described herein, medium 620 may be encoded with executable instructions for finding a network device on a network.

Referring to FIG. 6, instructions 622, when executed by a processor, may cause a computing device to obtain a plurality of images of a physical space that includes a plurality of designated areas. Instructions 624, when executed by a processor, may cause a computing device to identify, within the plurality of images, a set of images representing the same person, wherein at least two of the set of images are captured by different cameras having different fields of view. Instructions 626, when executed by a processor, may cause a computing device to determine a set of timestamps and a set of designated areas corresponding to the set of images, respectively. Instructions 628, when executed by a processor, may cause a computing device to generate path data associated with the person based on the set of timestamps and the set of the designated areas. Instructions 630, when executed by a processor, may cause a computing device to update a behavioral model based at least on the path data. As discussed above, the behavioral model may include, among other things, analytical data, where the analytical data may indicate any combination of the following: the most visited designated area among the plurality of designated areas, the least visited designated area among the plurality of designated areas, and the correlation between visits to a first area from the plurality of designated areas and visits to a second area from the plurality of designated areas.

Other instructions, not shown in FIG. 6 for brevity, may include instructions that, when executed by a processor, may cause a computing device to determine, based on at least one of the set of images, personal data associated with the person, (where the personal data may include at least an age or a gender) and update the behavioral model based on the characteristic of the person. Other instructions, also not shown for brevity, may include instructions that, when executed by a processor, may cause a computing device to obtain purchase data from an electronic point-of-sale (EPOS) system, determine whether the purchase data is associated with the person, and if the purchase data is associated with the person, update the behavioral model based on the purchase data.

The invention claimed is:

1. A computing device comprising:
- a processor; and
- a memory storing instructions that when executed cause the processor to:
  - obtain a plurality of images of a physical space,
  - identify, within the plurality of images, a set of images of a same first person within the physical space, wherein at least two of the set of images are captured by different cameras having different fields of view,
  - based on the set of images, determine a first path taken by the first person within the physical space,
  - obtain a behavioral model including data representing a plurality of historical paths taken by a plurality of people within the physical space, wherein the behavioral model includes different path categories associated with the plurality of people, including a path category associated with browsers in the physical space and a path category associated with focused shoppers in the physical space,
  - determine a path category associated with the first person based on metadata of the first path taken by the first person, and
  - update the behavioral model with information of the first person and data that represents the first path taken by the first person within the physical space and the path category associated with the first person.

2. The computing device of claim 1, wherein determining the first path comprises determining, based on the set of images, a set of one or more designated areas visited by the first person, and determining, for each designated area within the set of designated areas, at least one of:
- a description of the designated area;
- a set of objects located at the designated area;
- a time at which the first person visited the designated area;
- an amount of time spent by the first person at the designated area;
- whether the first person inspected a product at the designated area; and
- whether the first person left the designated area with the product.

3. The computing device of claim 2, wherein each of the set of images is associated with metadata, and wherein the instructions are executable to cause the processor to use the metadata to determine, for each of the designated areas, at least one of:
- the description of the designated area;
- the set of objects located at the designated area;
- the time at which the first person visited the designated area; and
- the amount of time spent by the first person at the designated area.

4. The computing device of claim 1, wherein the behavioral model comprises analytical data statistically representing the plurality of paths.

5. The computing device of claim 1, wherein the instructions are executable to cause the processor to execute a statistical analysis on the data representing the historical paths taken by the plurality of people to generate the path categories shared by the plurality of people, including the path category associated with browsers in the physical space and the path category associated with focused shoppers in the physical space.

6. The computing device of claim 1, wherein the instructions are executable to cause the processor to:
- obtain purchase data from an electronic point-of-sale (EPOS) system;
- determine whether the purchase data is associated with the first person; and
- if the purchase data is associated with the first person, update the behavioral model based on the purchase data.

7. The computing device of claim 1, wherein the different fields of view do not overlap, and wherein exact orientation of the different cameras is unknown.

8. A method comprising:

obtaining at least two images of a first person from at least two cameras located in a plurality of designated areas of a physical space;

obtaining, by a processor of a computing device, metadata associated with the images of the first person;

based on the images and the metadata, determining, by the processor, within the plurality of designated areas a set of designated areas visited by the first person;

for each designated area within the set of designated areas, determining, by the processor, an area information of a first path taken by the first person in the physical space, wherein the area information comprises at least one of:

a description of the designated area, a set of objects located at the designated area, a time at which the first person visited the designated area, an amount of time spent by the first person at the designated area, whether the first person inspected a product at the designated area, and whether the first person left the designated area with the product; and executing, by the processor, a statistical analysis on data that represents historical paths taken by a plurality of people in the physical space to generate different path categories shared by the plurality of people;

classifying, by the processor, the first person according to one of the different path categories based on the area information of the first path taken by the first person;

updating, by the processor, a database with information related to the first person, including the path category associated with the first person in the physical space and data associated with the set of designated areas visited by the first person and the area information associated with each designated area within the set of designate areas.

9. The method of claim 8, wherein the metadata identifies which of the two cameras are directed at which of the plurality of designated areas.

10. The method of claim 8, further comprising:

obtaining purchase data from an electronic point-of-sale (EPOS) system;

determining whether the purchase data corresponds to the first person; and if the purchase data corresponds to the first person, updating the database based on the purchase data.

11. The method of claim 10, wherein the purchase data comprises a timestamp, and wherein determining whether the purchase data corresponds to the first person comprises:

identifying, within the set of designated areas, a first designated area associated with the EPOS system; and comparing the timestamp to the time at which the first person visited the first designated area.

12. A non-transitory machine-readable storage medium storing instructions executable by a processor of a computing device to cause the computing device to:

obtain a plurality of images of a physical space comprising a plurality of designated areas;

identify, within the plurality of images, a set of images of a same first person, wherein at least two of the set of images are captured by different cameras having different fields of view;

from the set of images, determine a set of designated areas visited by the first person and a set of timestamps on the set of images, respectively;

generate path data associated with the first person based on the set of timestamps and the set of the designated areas;

classify the first person according to one of a plurality of different path categories in a behavioral model based on the path data associated with the first person, wherein the behavioral model incorporates data that represents historical paths taken by a plurality of people in the physical space; and update the behavioral model based on information related to the first person, including the path data associated with the first person and the path category associated with the first person in the physical space.

13. The non-transitory machine-readable storage medium of claim 12, wherein the instructions are further to cause the computing device to:

determine, based on at least one of the set of images, personal data associated with the first person, wherein the personal data comprises at least one of an age and a gender; and update the behavioral model based on the characteristic of the first person.

14. The non-transitory machine-readable storage medium of claim 12, wherein the behavioral model comprises analytical data indicating at least one of:

a most visited designated area among the plurality of designated areas;

a least visited designated area among the plurality of designated areas; and a correlation between visits to a first area from the plurality of designated areas and visits to a second area from the plurality of designated areas.

15. The non-transitory machine-readable storage medium of claim 14, wherein the instructions are further to cause the computing device to:

obtain purchase data from an electronic point-of-sale (EPOS) system;

determine whether the purchase data is associated with the first person; and if the purchase data is associated with the first person, update the behavioral model based on the purchase data.

16. The non-transitory machine-readable storage medium of claim 12, wherein the instructions are further to cause the computing device to:

execute a statistical analysis on the data representing the historical paths taken by the plurality of people in the physical space to generate the different path categories in the behavioral model.

17. The non-transitory machine-readable storage medium of claim 12, wherein the different path categories in the behavioral model include a path category associated with browsers and a path category associated with focused shoppers.

18. The method of claim 8, wherein the different path categories include a path category associated with browsers in the physical space and a path category associated with focused shoppers in the physical space.

* * * * *